(12) United States Patent
Schlesinger et al.

(10) Patent No.: US 10,783,778 B2
(45) Date of Patent: Sep. 22, 2020

(54) TRAFFIC DATA RECONCILIATION AND BROKERING

(71) Applicant: Microsoft Technology Licensing, LLC, Redmond, WA (US)

(72) Inventors: Benny Schlesinger, Ramat Hasharon (IL); Shira Weinberg, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/789,843

(22) Filed: Oct. 20, 2017

(65) Prior Publication Data

US 2019/0122544 A1    Apr. 25, 2019

(51) Int. Cl.
*G06G 7/70* (2006.01)
*G06G 7/76* (2006.01)
(Continued)

(52) U.S. Cl.
CPC ....... *G08G 1/0141* (2013.01); *G01C 21/3492* (2013.01); *G08G 1/012* (2013.01);
(Continued)

(58) Field of Classification Search
CPC .. G08G 1/0141; G08G 1/0967; G08G 1/0108; G08G 1/0129; G08G 1/0133; G01C 21/3667; G01C 21/3492; G01C 21/3697; G01C 21/3461; G01C 21/3415; G06G 7/76; G06Q 10/083; G05D 1/0088; G05D 1/0287
(Continued)

(56) References Cited

U.S. PATENT DOCUMENTS 7,610,151 B2    10/2009  Letchner et al.
7,696,866 B2     4/2010  Horvitz
(Continued)

FOREIGN PATENT DOCUMENTS

WO    2005043082 A1    5/2005

OTHER PUBLICATIONS

"International Search Report and Written Opinion Issued in PCT Application No. PCT/US2018/055754", dated May 8, 2019, 19 Pages.

*Primary Examiner* — Mahmoud S Ismail
(74) *Attorney, Agent, or Firm* — Watson Patents, PLC; Vladan M. Vasiljevic

(57) ABSTRACT

Traffic data reconciliation and brokering are provided. A traffic data brokering system ingests traffic-related data provided from a plurality of data sources, analyzes the data, and reconciles the data for identifying accurate, up-to-date, and comprehensive traffic data. The system identifies current traffic conditions based on identified relationships between pieces of received data, calculates confidence scores, and determines which pieces of data are accurate based on the calculated confidence scores. The traffic data brokering system provides the reconciled traffic data to various users of traffic data, such as individuals or third-party services. One aspect includes a route generation engine that determines and provides recommended route(s) to clients. Another aspect includes a forecast engine that predicts traffic conditions based on past traffic data. The forecasted data can be used to determine recommended routes. The system provides APIs for enabling sources and clients to provide and receive traffic data.

20 Claims, 8 Drawing Sheets

(51) Int. Cl.
*G08G 1/00* (2006.01)
*G08G 1/01* (2006.01)
*G08G 1/0968* (2006.01)
*G01C 21/34* (2006.01)
*H04N 7/18* (2006.01)
*G01C 21/36* (2006.01)

(52) U.S. Cl.
CPC ......... *G08G 1/0108* (2013.01); *G08G 1/0112* (2013.01); *G08G 1/0116* (2013.01); *G08G 1/0129* (2013.01); *G08G 1/0133* (2013.01); *G08G 1/096811* (2013.01); *G01C 21/3667* (2013.01)

(58) Field of Classification Search
USPC .......................................... 701/117; 348/159
See application file for complete search history.

(56) References Cited

U.S. PATENT DOCUMENTS

| | | | |
|---|---|---|---|
| 7,698,055 | B2 | 4/2010 | Horvitz et al. |
| 7,739,040 | B2 | 6/2010 | Horvitz |
| 7,948,400 | B2 | 5/2011 | Horvitz et al. |
| 8,126,641 | B2 | 2/2012 | Horvitz |
| 9,086,292 | B2 | 7/2015 | Horvitz et al. |
| 9,163,952 | B2 | 10/2015 | Viola et al. |
| 9,714,831 | B2 | 7/2017 | Kapoor et al. |
| 2002/0077741 | A1* | 6/2002 | Hanebrink ............. G01C 21/26 701/117 |
| 2014/0160295 | A1* | 6/2014 | Kyomitsu ............ G08G 1/0112 348/159 |
| 2015/0198722 | A1 | 7/2015 | Ben-akiva et al. |
| 2017/0146353 | A1 | 5/2017 | Kroeller et al. |
| 2017/0262790 | A1* | 9/2017 | Khasis ............... G01C 21/3415 |
| 2019/0087868 | A1* | 3/2019 | Setty ...................... H04L 67/20 |

* cited by examiner

TRAFFIC DATA RECONCILIATION AND BROKERING

BACKGROUND

A variety of mapping or navigation services exist that provide applications for helping users to navigate to their destinations. Each existing service typically comprises a backend service for collecting and reconciling traffic data for its own use. Accordingly, existing navigation services use traffic data that may be incomplete and prone to errors. Further, because each service is collecting its own traffic data, it can take longer for a service to collect enough information to confidently identify a traffic condition. Therefore, users may not receive information related to road hazards or traffic conditions in time to avoid them.

SUMMARY

This Summary is provided to introduce a selection of concepts in a simplified form that are further described below in the Detailed Description section. This Summary is not intended to identify key features or essential features of the claimed subject matter, nor is it intended as an aid in determining the scope of the claimed subject matter.

Aspects are directed to an automated system, method, and computer readable storage device for providing traffic data reconciliation and brokering. For example, a traffic data brokering system is provided that serves as a trusted source of traffic data to multiple consumers of traffic data. The traffic data brokering system is operative or configured to collect traffic-related data from a plurality of sources, reconcile the collected data, and provide reconciled traffic data to various users of traffic data, such as individuals or third-party services. Advantageously, traffic data users are provided with complete and accurate traffic data. Additionally, in some examples, the traffic data brokering system determines and provides recommended route(s) to requesting clients. In other examples, the traffic data brokering system learns traffic condition patterns based on past traffic data and predicts traffic conditions based on the learned patterns. The forecasted data can be used to determine efficient routes and to recommend the routes to requesting clients. The traffic data brokering system provides APIs (Application Programming Interfaces) for enabling sources and clients to provide and receive traffic data.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following Detailed Description and a review of the associated drawings. It is to be understood that the following Detailed Description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
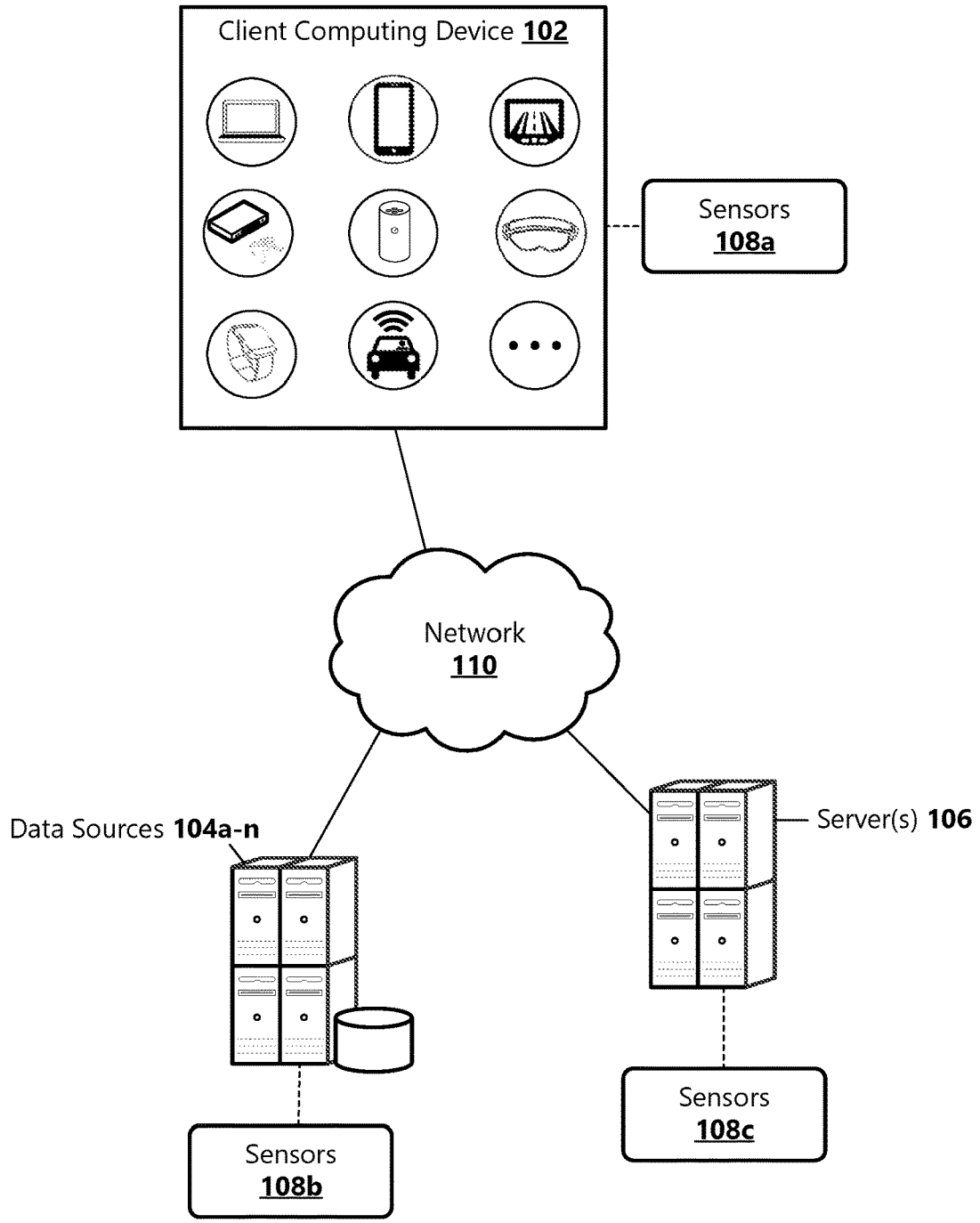
FIG. 1 is a block diagram showing an example operating environment for implementing aspects of the present disclosure.

The following Detailed Description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following Detailed Description is not limiting, but instead, the proper scope is defined by the appended claims. Examples may take the form of a hardware implementation, or an entirely software implementation, or an implementation combining software and hardware aspects. The following Detailed Description is, therefore, not to be taken in a limiting sense.

Aspects of the present disclosure are directed to a method, system, and computer readable storage device for providing traffic data reconciliation and brokering. Among other benefits, traffic data reconciliation and brokering enables the generation of reliable, accurate, and timely traffic data based on reconciliation of a variety of data from a plurality of data sources. As used herein, the term "to broker" and terms related to "brokering" shall be understood to include operations as a trusted intermediary between assorted sources of traffic-related data and consumers of traffic-related data to aggregate and provide data that have been reconciled to ensure that the data are reliable, accurate, comprehensive, and relevant. Further, as used herein, the term "to reconcile" and terms related to "reconciling" shall be understood to include operations associated with corroborating a piece of traffic-related data with other received data, analyzing the reliability of data from different services over time, accepting a confidence level for each piece of data it receives, and rating the traffic data from each party based on the safety record of the data provider. With reference now to FIG. 1, a block diagram is provided showing an example operating environment 100 in which aspects of the present disclosure can be employed. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, some functions can be carried out by a processor executing instructions stored in memory.

As illustrated, the example operating environment 100 includes one or more client computing devices 102*a-n* (generally 102), a plurality of data sources 104*a-n* (generally 104), one or more servers 106*a-n* (generally 106), sensors 108*a-n* (generally 108), and a network 110 or a combination of networks. Each of the components illustrated in FIG. 1 can be implemented via any type of computing device, such as the computing devices 500, 600, and 705*a,b,c* described in reference to FIGS. 5, 6A, 6B, and 7. As an example, the one or more computing devices 102 can be one of various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, speaker devices, internet of things (IoT) devices, navigation computing devices, etc.

The components can communicate with each other via a network 110, which can include, without limitation, one or more local area networks (LANs) or wide area networks (WANs). In some examples, the network 110 comprises the Internet and/or a cellular network, amongst any of a variety of possible public or private networks. As should be appreciated, any number of computing devices 102, data sources 104, and servers 106 can be employed within the example operating environment 100 within the scope of the present disclosure. Each can comprise a single device or a plurality of devices cooperating in a distributed environment. For example, the server 106 can be provided via multiple devices arranged in a distributed environment that collectively provide various functionalities described herein. In some examples, other components not shown can be included within the distributed operating environment 100.

According to an aspect, the plurality of data sources 104 can comprise data sources or data systems that are configured to make data available to any of the various components of operating environment 100 or of the example traffic data brokering system 210 described below with reference to FIG. 2. In some examples, the plurality of data sources 104 are discrete from the one or more computing devices 102 and the at least one server 106. In other examples, the one or more data sources 104 are incorporated or integrated into at least one of the computing devices 102 or servers 106.

Figure 2:
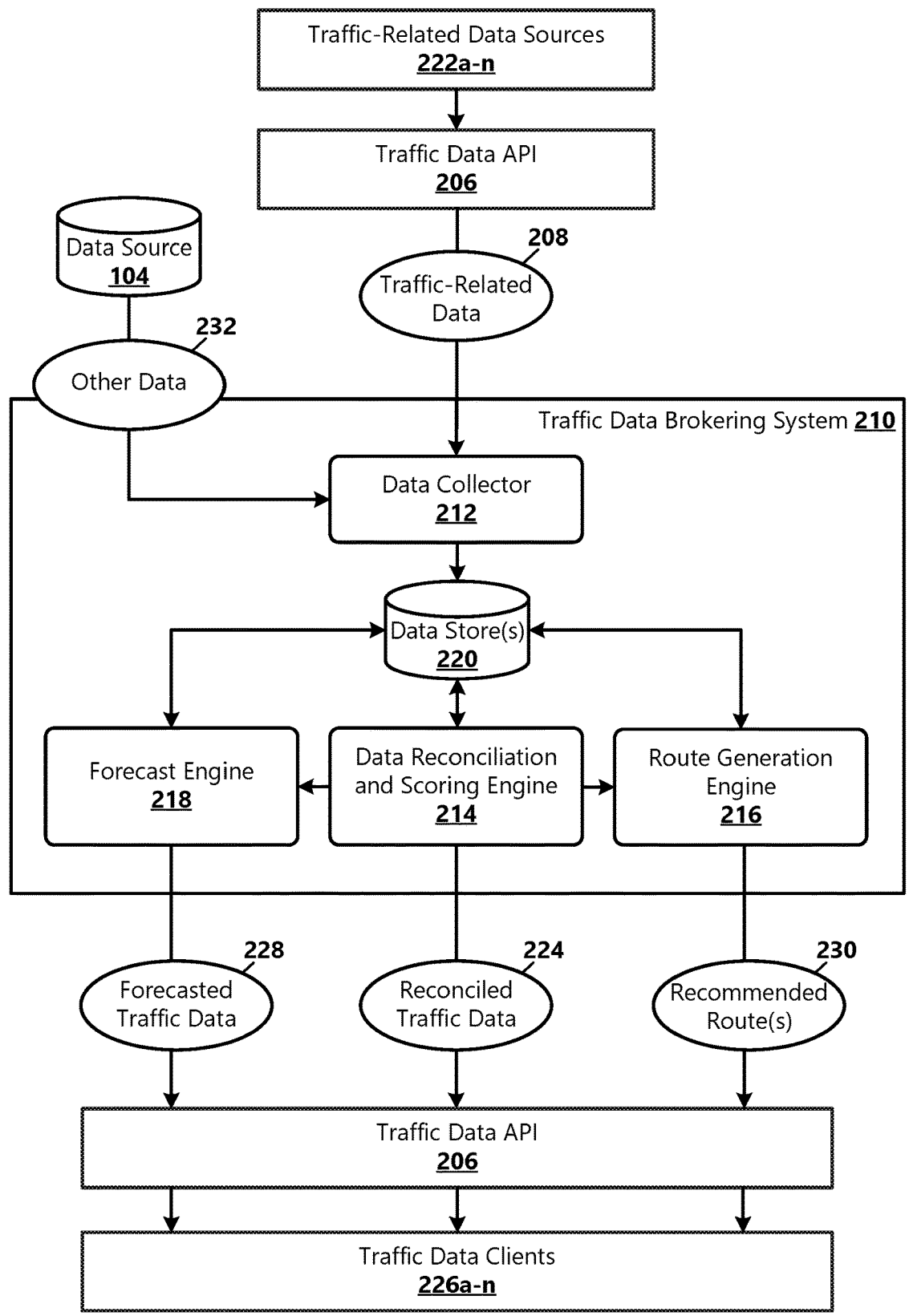
FIG. 2 is a block diagram showing an example computing architecture for implementing aspects of the present disclosure.

The example operating environment 100 can be used to implement one or more of the components of the example traffic data brokering system 210 described in FIG. 2, including components for providing traffic data reconciliation and brokering. For example, aspects of the example traffic data brokering system 210 broker traffic data between sources of traffic data and users of traffic data. That is, the traffic data brokering system 210 serves as a trusted intermediary between traffic-related data sources 222*a-n* (generally, 222) and consumers to provide traffic data that have been reconciled to ensure that the traffic data provided to traffic data consumers are reliable, accurate, and relevant. Aspects of the traffic data brokering system 210 are operative or configured to collect and aggregate traffic-related data 208 from a plurality of traffic-related data sources 222, and reconcile the collected data for provision to various traffic data clients 226*a-n* (generally, 226) by one or more of: analyzing the reliability of the data from different services over time and rating the data from the different services based on a safety record of the traffic-related data source 222, accepting a confidence level for each piece of data it accepts, and corroborating the data with data received from other sources. A block diagram is provided that shows aspects of an example computing system architecture suitable for implementing various aspects of the present disclosure. The traffic data brokering system 210 represents only one example of a suitable computing system architecture. Other arrangements and elements can be used in addition to or instead of the elements shown. As should be appreciated, elements described herein are functional entities that can be implemented as discrete or distributed components, or in conjunction with other components, and in any suitable combination or location. In some examples, components of the traffic data brokering system 210 are implemented on a client computing device 102. In other examples components of the traffic data brokering system 210 are implemented on one or a plurality of servers 106. For example, a server 106 is operative or configured to provide data to and receive data from the client computing device 102 through a network 110 or a combination of networks. In some examples, the traffic data brokering system 210 is a hybrid system that includes the client computing device 102 in conjunction with one or more servers 106. The hardware of these computing devices is discussed in greater detail in regard to FIGS. 5, 6A, 6B, and 7.

With reference now to FIG. 2, the example traffic data brokering system 210 includes a data collector 212, a data reconciliation and scoring engine 214, a route generation engine 216, a forecast engine 218, and one or more data stores 220. The data collector 212 is illustrative of a software module, software package, system, or device operative or configured to receive or collect a variety of traffic-related data 208 from various traffic-related data sources 222. Examples of traffic-related data sources 222 include such sources as: news sources, weather information sources, social networks, traffic condition sources (e.g., traffic cameras, road sensors), local, state, or federal transportation agencies, navigation services, mobile service providers, event information sources, school schedule sources, etc. Traffic-related data 208 that are collected can include road construction information, road closure information, traffic incident information, traffic condition information, safety and road hazard information, weather-related information, event-related information, schools' schedule information, and the like. According to one aspect, the data shared by a traffic-related data source 222 can be limited, in particular, data shared by competing navigation services. In some examples, the amount or type of data shared by certain traffic-related data sources 222 can be mandated (e.g., road hazard information, safety information) in accordance with laws enacted with the intention to reduce traffic accidents and to save lives.

In various examples, traffic-related data sources 222 can include a plurality of client computing devices 102 (e.g., mobile devices, vehicle computing systems, navigation computing devices) that are operative or configured to provide traffic-related data 208 collected by various sensors 108 integrated in or communicatively attached to the computing devices and/or traffic-related data 208 input by users of the computing devices. According to an aspect, the data collector 212 is further operative or configured to receive other data 232 (e.g., map data, points of interest (POI) data, business-related data, contacts data, calendar and schedule data) from one or more other data sources 104 (e.g., map data providers, social networks, business directories, contacts lists, calendars). Other traffic-related data sources 222 and other data sources 104 are possible and are within the scope of the present disclosure.

The sensors 108 can be embodied as hardware, software, or a combination of hardware and software operative to sense, detect, or otherwise obtain traffic-related data 208.

For example, sensors 108 can include such sensors as global positioning system (GPS) receivers, gyroscopes, accelerometers, speedometers, wireless network receivers, cameras, or other detector component(s) operative or configured to sense or determine traffic-related data 208 (e.g., location, motion, speed, orientation, position, wireless network data, device pairings, gyroscope data, accelerometer data, weather, news (including popular or trending items on search engines or social networks), GPS signals, social network data).

According to an aspect, the traffic data brokering system 210 is operative or configured to provide one or more APIs (Application Programming Interfaces) 206 for enabling the traffic data brokering system 210 to ingest traffic-related data 208 from the plurality of traffic-related data sources 222 and other data 232 from other data sources 104. For example, the one or more APIs 206 are configured to enable communication of traffic-related data 208 between a traffic-related data source 222 and the traffic data brokering system 210 and communication of other data 232 between another data source 104 and the traffic data brokering system 210. According to another aspect, the data collector 212 is operative or configured to stamp received data (i.e., traffic-related data 208 and other data 232) with a source stamp (e.g., identifying the traffic-related data source 222 or other data source 104 from which the data are received) and a time stamp. According to another aspect, the data collector 212 is further operative or configured to store the collected data 208, 232 in one or more data stores 220, where the data can be available to other components of the traffic data brokering system 210.

The data reconciliation and scoring engine 214 is illustrative of a software module, software package, system, or device operative or configured to reconcile the traffic-related data 208 collected from various traffic-related data sources 222 for confidently identifying accurate and comprehensive traffic conditions to broker to various traffic data clients 226. According to an aspect, the data reconciliation and scoring engine 214 applies machine learning, statistical analysis, behavioral analytics, and data mining techniques to received traffic-related data 208 for understanding the data, for example, to identify particular traffic conditions. In reconciling the received traffic-related data 208, the data reconciliation and scoring engine 214 identifies particular traffic conditions based on identified relationships between pieces of received traffic-related data, for example, according to one or a combination of location, time, event, school schedule, traffic condition, weather condition, road condition, and news related matter. An example of an identified traffic condition is stand-still traffic along a particular route due to a college football game. Other non-limiting examples of traffic conditions include an icy road (e.g., based on crowd-sourced data received from a plurality of client computing devices 102), heavy traffic on a particular road due to a wreck, and a road hazard at a particular location.

According to an aspect, the data reconciliation and scoring engine 214 is further operative or configured to calculate a confidence score for received traffic-related data 208. In some examples, traffic-related data sources 222 provide a confidence score associated with each piece of traffic-related data 208 that they provide to the traffic data brokering system 210. In other examples, the data reconciliation and scoring engine 214 calculates a confidence score for a piece of received traffic-related data 208 based on one or a combination of a traffic-related data source-provided confidence score, the traffic-related data source 222, corroboration of the piece of traffic-related data with other received traffic-related data, the particular traffic condition, and the age of the piece of traffic-related data. For example, a weight can be assigned to a particular traffic-related data source 222 based on a determined reliability of the source (e.g., reports from news sources are less accurate than traffic alerts based on vehicle sensors 108). As another example, a weight can be assigned to a particular traffic-related data source 222 for a particular traffic condition based on a determined reliability (e.g., a higher weight may be assigned to data from a data source that, based on historic data, is consistently accurate in reporting road hazards, a lower weight may be assigned to data from a data source that, based on historic data, is repeatedly inaccurate in reporting visibility conditions). As can be appreciated, the traffic data brokering system 210 has a full view of the traffic-related data 208 it receives, and thus can associate a credibility coefficient for each traffic-related data source 222 and use the credibility coefficient when calculating the confidence score of traffic-related data provided by particular traffic-related data sources. In some examples, traffic-related data 208 received from trusted traffic-related data sources 222 are confirmed more expeditiously (e.g., via assignment of a higher confidence score) than traffic-related data received from other less-trusted traffic-related data sources. As can be appreciated, traffic-related data 208 provided from different traffic-related data sources 222 can have some deviation in their properties (e.g., exact location, time of incident, number of automobiles involved). According to an aspect, when combining traffic-related data 208 and corroborating a piece of traffic-related data with other received traffic-related data, the data reconciliation and scoring engine 214 is operative or configured to apply a tolerance level towards a certain level of deviation in such properties. Accordingly, various pieces of traffic-related data 208 received from different traffic-related data sources 222 that are within the certain level of deviation can be determined to be associated with a single traffic condition.

According to an aspect, the data reconciliation and scoring engine 214 determines which pieces of received traffic-related data 208 are accurate based on the calculated confidence scores (e.g., highest ranking data, data with an associated confidence score that satisfies a threshold), and provides the reconciled traffic data 224 to one or more traffic data clients 226*a-n* (generally 226). In some examples, traffic data clients 226 include various third-party systems (e.g., navigation services, news services, social media services, local, state, or federal transportation agencies, mobile service providers, websites). In other examples, traffic data clients 226 include client computing devices 102, for example, on which one or more applications or a personal digital assistant operates and exposes the reconciled traffic data 224 to users. According to an aspect, the traffic data brokering system 210 is operative or configured to provide one or more APIs 206 for enabling traffic data clients 226 to access the reconciled traffic data 224. For example, the one or more APIs 206 are configured to enable a traffic data client 226 to access and utilize the reconciled traffic data 224, for example, for display to users, for notifying users, for combining with third-party data, for backend processing uses, etc.

According to some examples, the data reconciliation and scoring engine 214 stores reconciled traffic data 224 in one or more data stores 220 such that the data can be made available to other components of the traffic data brokering system 210. According to an aspect, the data collector 212 continually updates the one or more data stores 220 with reconciled traffic data 224. According to another aspect, the data reconciliation and scoring engine 214 is further operative or configured to apply a time decay factor to reconciled traffic data 224. The time decay factor can be a default factor based on the traffic condition according to historic data (e.g., one hour time decay factor for an automobile accident).

The route generation engine 216, illustrative of a software module, software package, system, or device, is operative or configured to determine one or more routes between locations based on identified traffic conditions 304 in the reconciled traffic data 224. According to an aspect, the route generation engine 216 retrieves map or navigation data (e.g., other data 232) from a map or navigation data source (e.g., data source 104) and merges identified traffic conditions with the map or navigation data to identify routes between two location points, calculate metrics such as distances and estimated travel times based on the reconciled traffic data 224 associated with the identified routes, determines one or more recommended routes 230 based on the calculated metrics, and provides the one or more recommended routes 230 to requesting traffic data clients 226 via an API 206.

In some examples, the forecast engine 218, illustrative of a software module, software package, system, or device, is operative or configured to access reconciled traffic data 224 for forecasting various traffic condition factors based on traffic patterns learned from collected historic traffic condition data. For example, the forecast engine 218 is a machine learning (ML) engine that applies statistical analysis, behavioral analytics, and data mining techniques to historic traffic condition data and other data 232, such as information collected from social media sources, news sources, user input, etc., for identifying characteristics of traffic conditions and learning and understanding patterns associated with traffic conditions that have shared or similar characteristics. Accordingly, the forecast engine 218 can predict traffic-related issues (i.e., forecasted traffic data 228) that are likely to occur based on past data.

According to an aspect, the forecast engine 218 is operative or configured to provide forecasted traffic data 228 to requesting traffic data clients 226 via an API 206. According to another aspect, the forecast engine 218 is operative or configured to store forecasted traffic data 228 in one or more data stores 220 such that the data can be accessed by other components of the traffic data brokering system 210, such as the route generation engine 216. For example, the route generation engine 216 is operative or configured to determine one or more recommended routes 230 based on metric calculations using forecasted traffic data 228, and provide the one or more recommended routes 230 to requesting traffic data clients 226 via an API 206.

Figure 3:
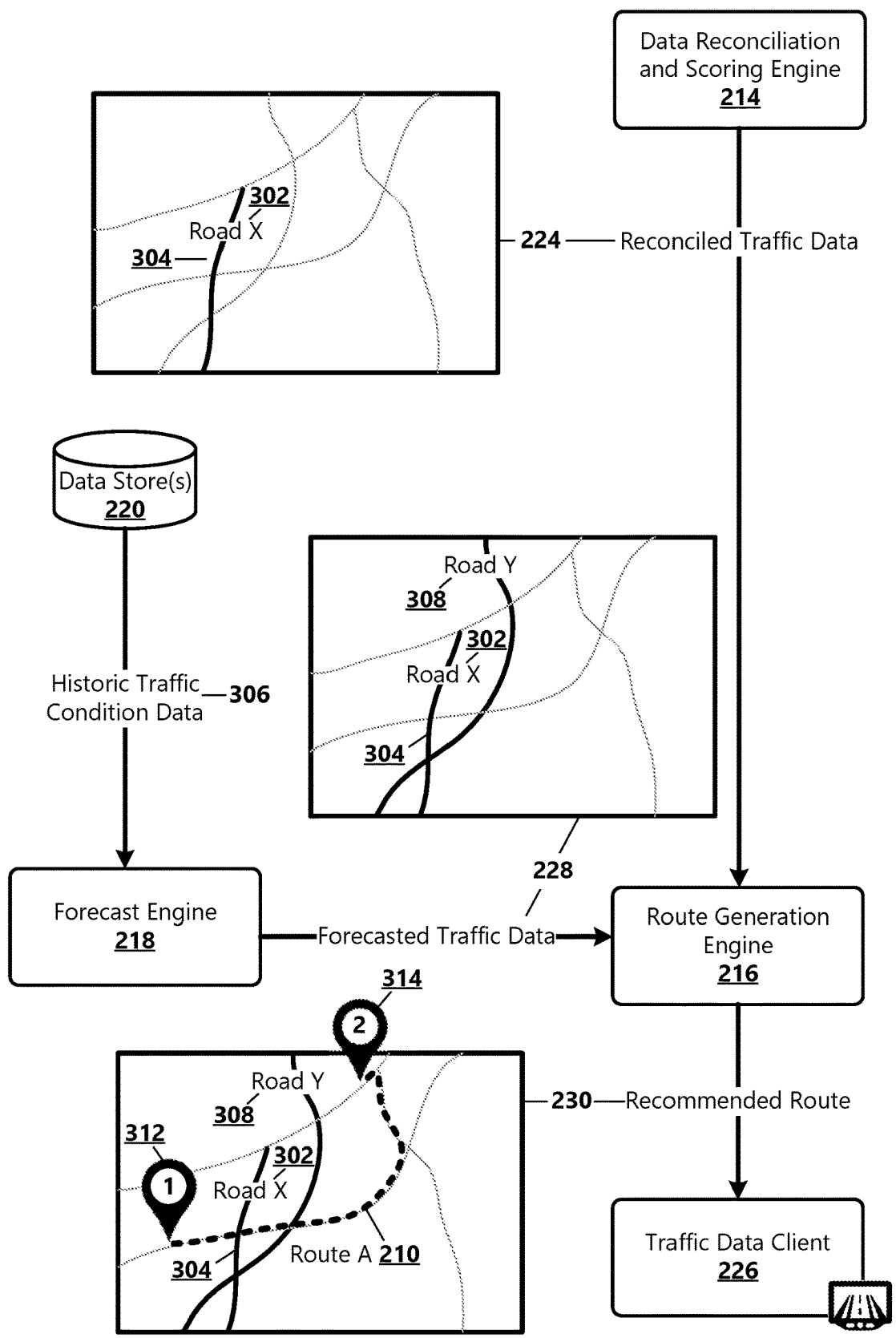
FIG. 3 shows an example use case scenario.

An example recommended route 230 based in part on forecasted traffic data 228 is illustrated in FIG. 3. With reference now to FIG. 3, in the illustrated example, the data reconciliation and scoring engine 214 reconciles received and collected traffic-related data 208 and provides reconciled traffic data 224 to the route generation engine 216. For example, the reconciled traffic data 224 includes information associated with an identified current traffic condition 304 along a particular road: road X 302. In the example, road X 302 is blocked (i.e., a traffic condition 304 according to reconciled traffic data 224).

Further, the forecast engine 218 identifies characteristics associated with various traffic conditions documented in historic traffic condition data 306 collected and stored in one or more data stores 220. The forecast engine 218 learns patterns associated with the various traffic conditions, and generates forecast data for various traffic conditions based on various traffic condition characteristics. For example, based on historic traffic condition data 306 associated with the identified current traffic condition 304, the forecast engine 218 predicts that road Y 308 will become backed up due to drivers trying to avoid road X 302 (forecasted traffic data 228). In some examples, the forecast engine 218 can predict additional information, such as a length of time the road Y 308 will likely be backed up, an estimated extent (e.g., distance, congestion amount) of the backup.

The route generation engine 216 accesses the forecasted traffic data 228, and determines a particular route, route A 210, as a recommended route 230 from a first location 312 to a second location 314, such as to avoid road X 302 and road Y 308. The first location 312 and the second location 314 can be communicated to the route generation engine 216 by a traffic data client 226 via the API 206. In one example, the first location 312 and the second location 314 are explicitly defined starting and ending points input by a user. In another example, the first location 312 and the second location 314 are inferred based on data collected by various sensors 106. The route generation engine 216 further provides the recommended route 230 to the traffic data client 226 via the API 206.

Advantageously, the disclosed aspects enable the benefit of technical effects that include, but are not limited to, improved efficiency and accuracy of providing traffic data to various traffic data clients 226 while providing an improved user experience. Further, client computing device 102 processing and bandwidth usage associated with traffic-related data queries are reduced by utilizing the traffic data brokering system 210 as a broker between a plurality of sources of traffic data and the users of the traffic data and a provider of accurate real-time or near real-time traffic information including data associated with identified traffic conditions 304.

Figure 4:
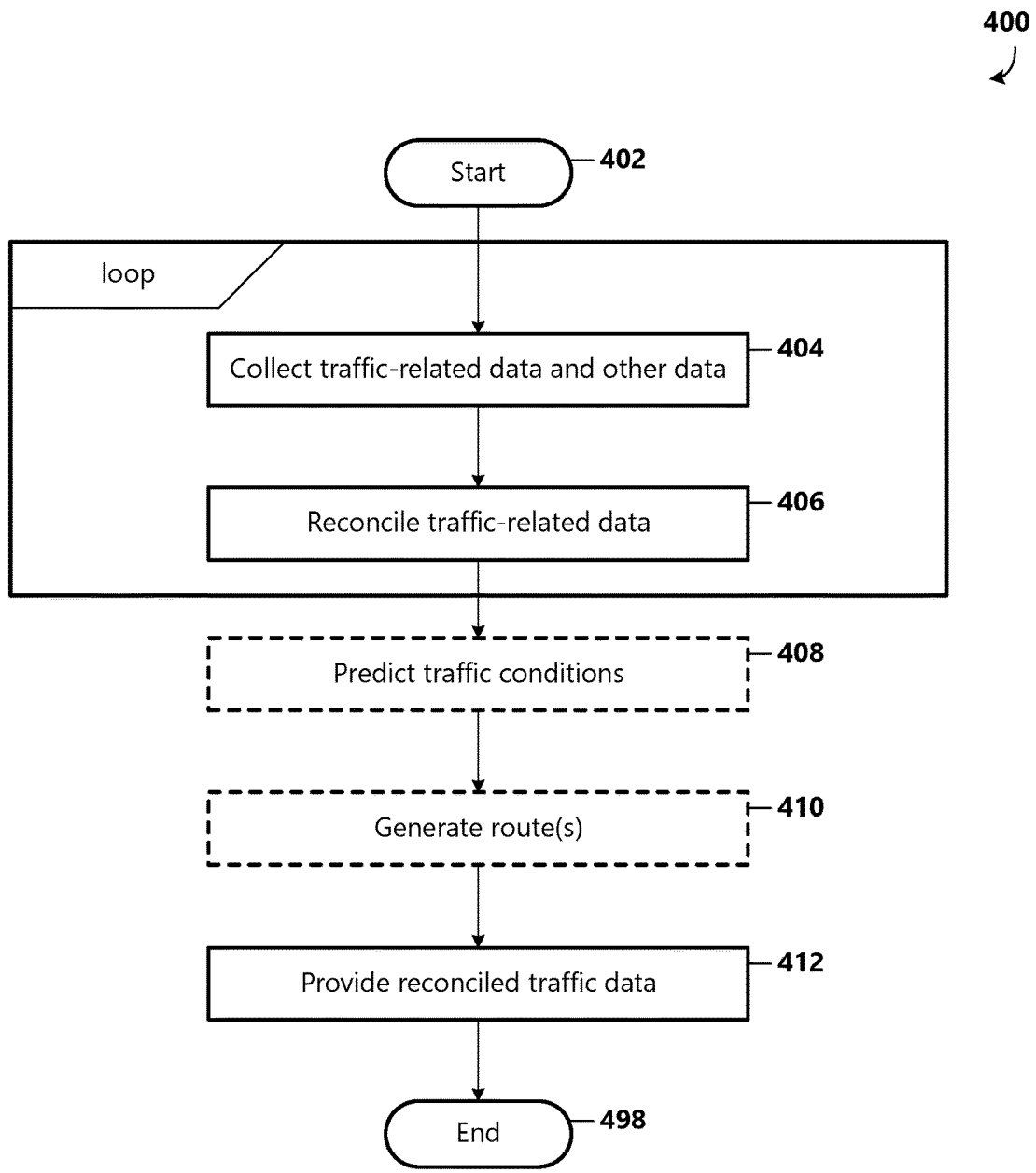
FIG. 4 is a flow chart showing general stages involved in an example method for providing traffic data reconciliation and brokering.

Having described an operating environment 100, components of the traffic data brokering system 210, and an example use case scenario with respect to FIGS. 1-3, FIG. 4 is a flow chart showing general stages involved in an example method 400 for reconciling and brokering traffic data. With reference now to FIG. 4, the method 400 begins at start OPERATION 402, and proceeds to OPERATION 404, where the data collector 212 receives a variety of traffic-related data 208 (e.g., road construction information, road closure information, traffic incident information, traffic condition information, safety and road hazard information, weather-related information, event-related information, schools' schedule information) from a plurality of traffic-related data sources 222 via one or more APIs 206.

At OPERATION 406, the data reconciliation and scoring engine 214 reconciles collected traffic-related data 208, for example, by identifying current traffic conditions based on identified relationships between pieces of received traffic-related data, calculates confidence scores for received traffic-related data, and determines which pieces of received traffic-related data are accurate based on the calculated confidence scores (e.g., highest ranking data, data with an associated confidence score that satisfies a threshold). Further, the data reconciliation and scoring engine 214 stores the reconciled traffic data 224 in one or more data stores 220, and continually updates the one or more data stores 220 with reconciled traffic data 204.

The method 400 optionally proceeds to OPERATION 408, where the machine learning forecast engine 218 applies statistical analysis, behavioral analytics, and data mining techniques to historic traffic condition data and other data 232, such as information collected from social media sources, news sources, user input, etc., identifies characteristics of traffic conditions, and learns and understands patterns associated with traffic conditions that have shared or similar characteristics. Further, the forecast engine 218 can predict traffic-related issues (i.e., forecasted traffic data 228) that are likely to occur for a particular traffic condition 304 based on historic traffic condition data 306.

The method 400 optionally proceeds to OPERATION 410, where the route generation engine 216 determines one or more routes between locations 312, 314 based on identified traffic conditions 304 included in the reconciled traffic data 224. For example, the route generation engine 216 merges identified traffic conditions 304 with map or navigation data to identify routes between two location points, calculate metrics (e.g., distances, estimated travel times) based on the reconciled traffic data 224 associated with the identified routes, and determine one or more recommended routes 230 based on the calculated metrics. In some examples, the route generation engine 216 determines one or more routes between locations 312, 314 based at least in part on forecasted traffic data 228 generated by the forecast engine 218.

At OPERATION 412, the traffic data brokering system 210 provides one or a combination of reconciled traffic data 224, forecasted traffic data 228, and recommended routes 230 data to requesting traffic data clients 226 (e.g., client computing devices 102 executing applications or a digital personal assistant operative to expose the data to users, third-party systems, navigation services, news services, social media services, local, state, or federal transportation agencies, mobile service providers, websites). For example, the traffic data brokering system 210 serves as a trusted broker of traffic data that have been collected from various traffic-related data sources 222 and reconciled for ensuring accuracy and reliability of the data for provisions to various traffic data clients 226. The method 400 ends at END OPERATION 498.

While implementations have been described in the general context of program modules that execute in conjunction with an application program that runs on an operating system on a computer, those skilled in the art will recognize that aspects can also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
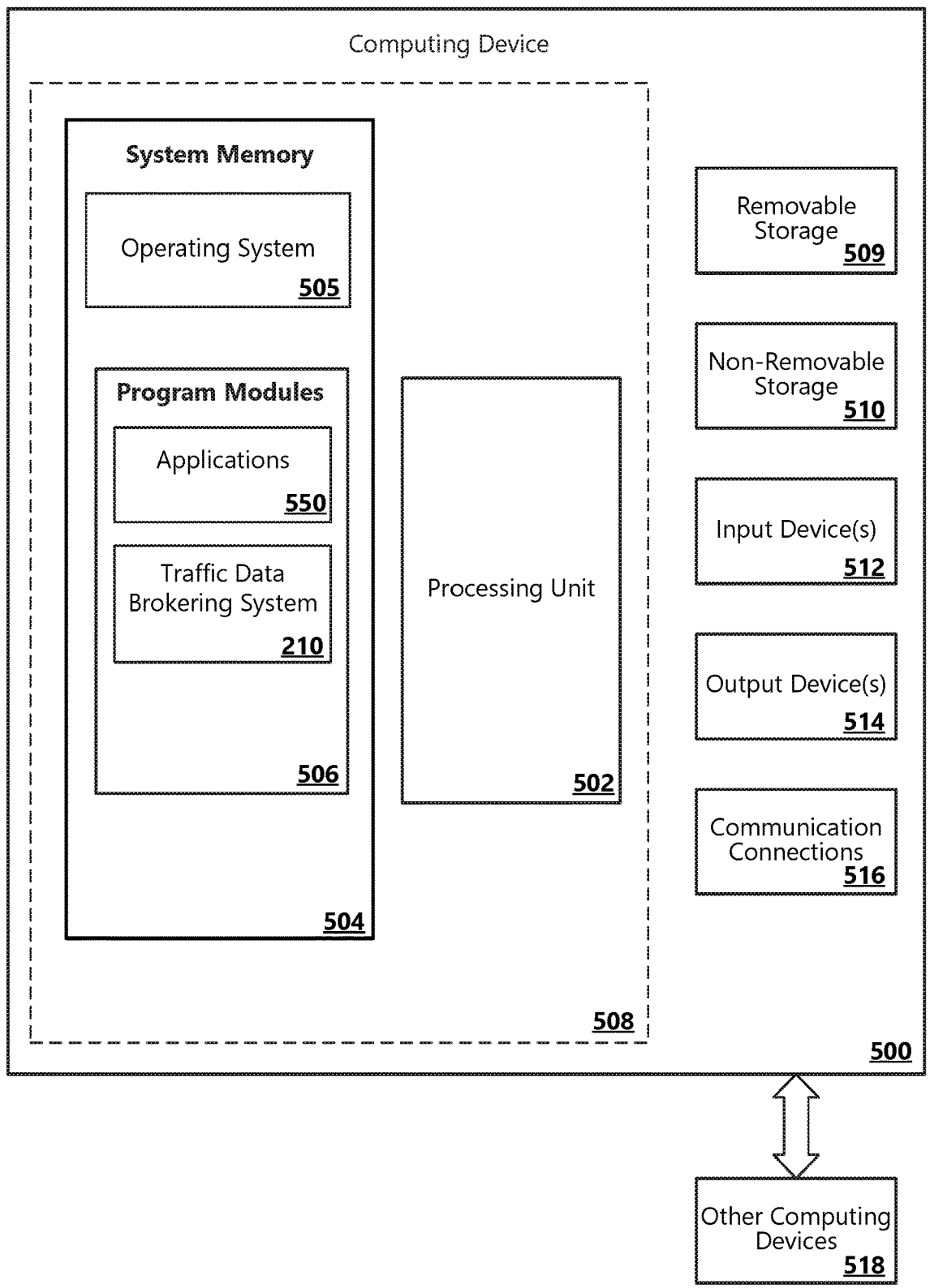
FIG. 5 is a block diagram illustrating example physical components of a computing device.
Figure 6A:
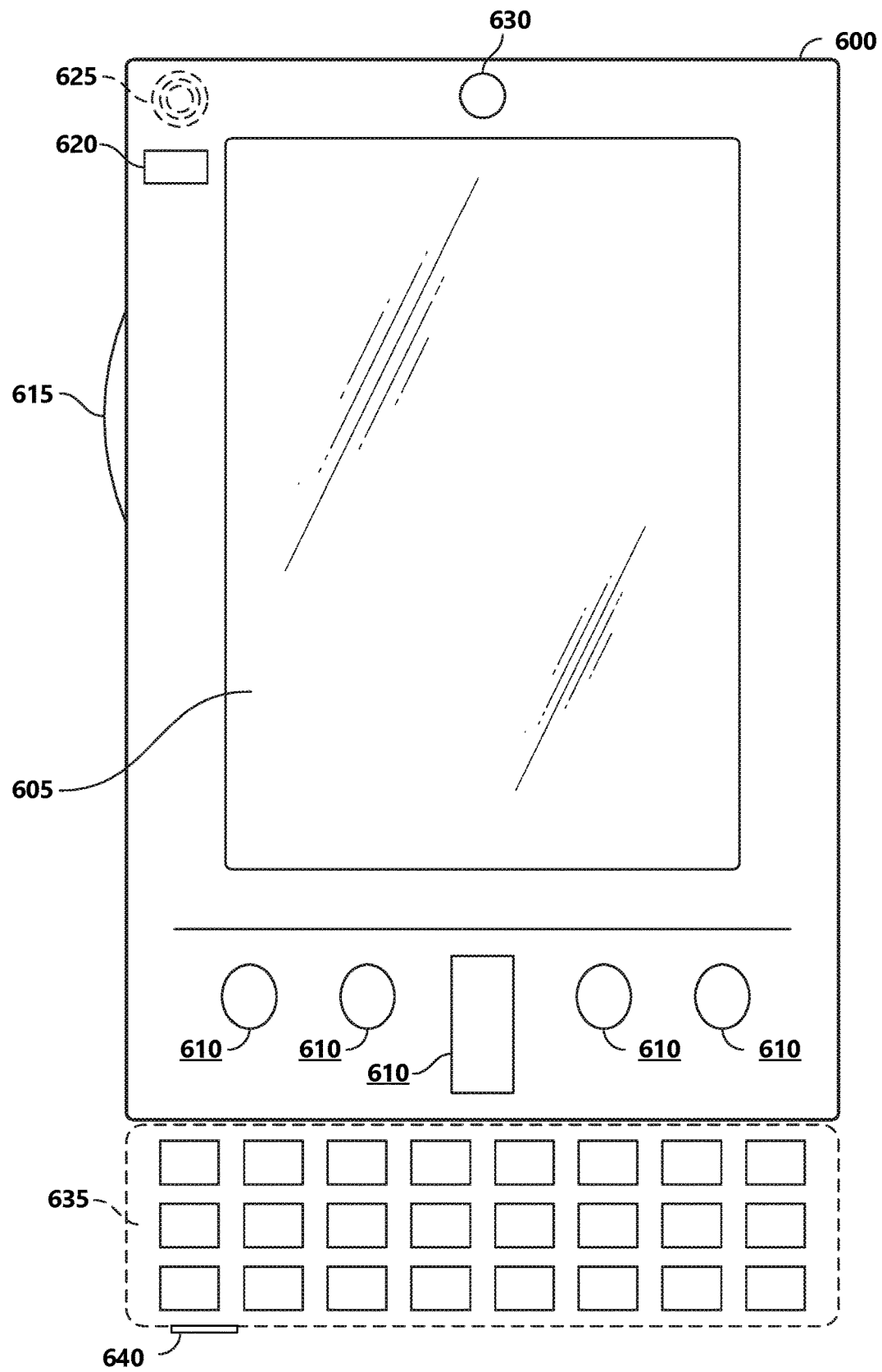
FIGS. 6A and 6B are simplified block diagrams of a mobile computing device.
Figure 6B:
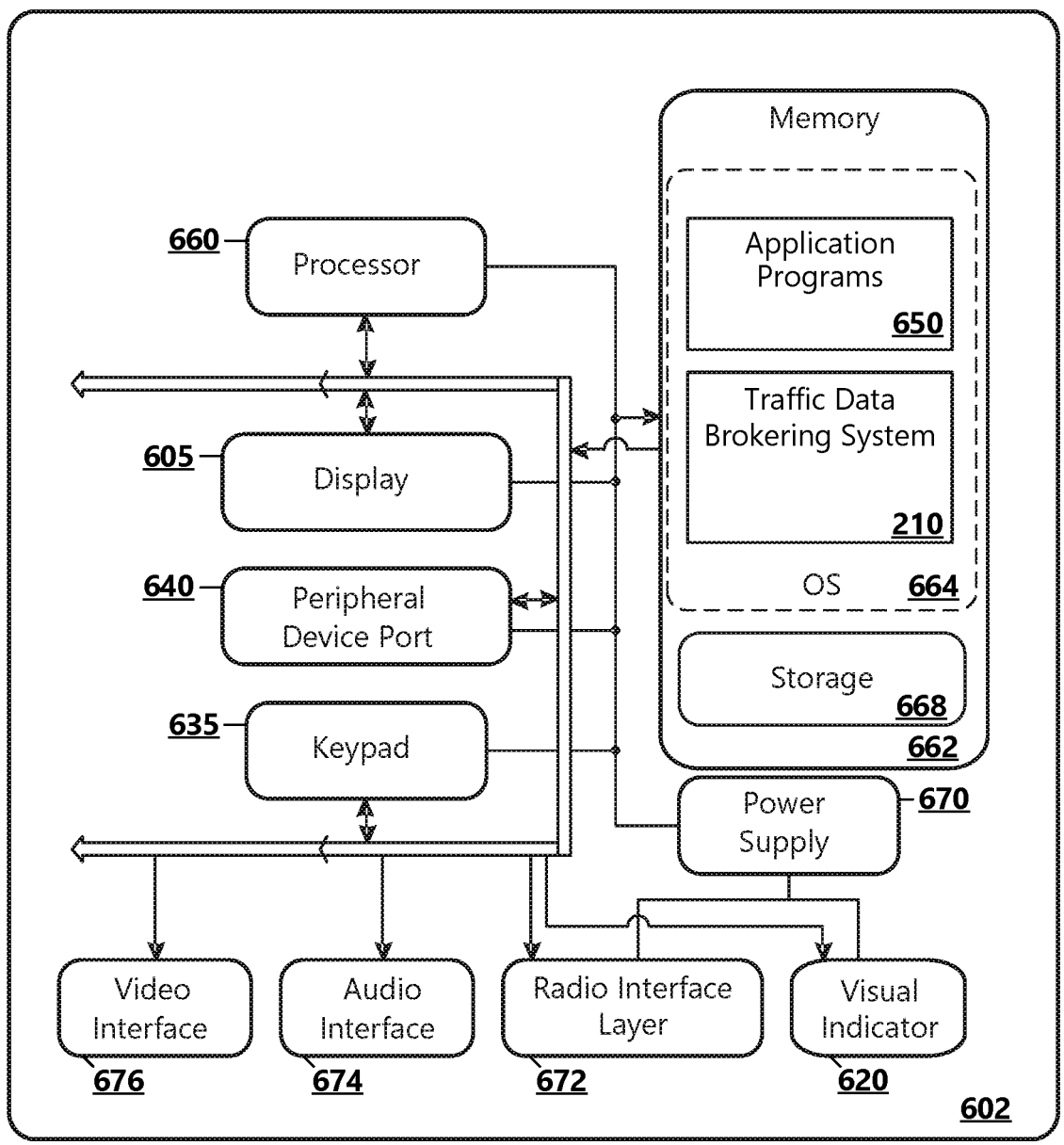
Figure 7:
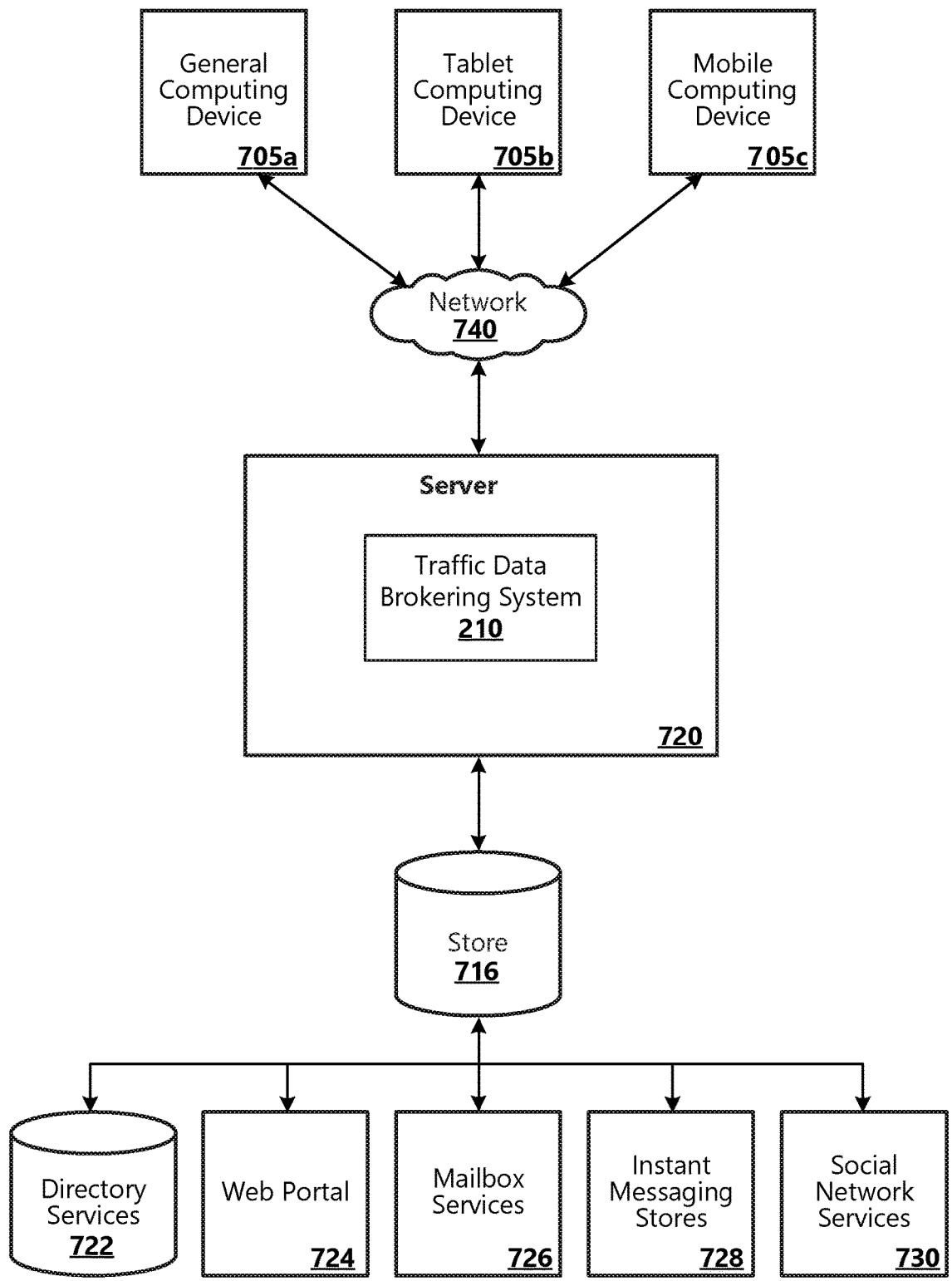
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the one or more components of the traffic data brokering system 210. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., one or more components of the traffic data brokering system 210) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, one or more components of the traffic data brokering system 210 are loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for reconciling and brokering traffic data as described above. Content developed, interacted with, or edited in association with the one or more components of the traffic data brokering system 210 are enabled to be stored in different communication channels or other storage types. For example, various documents may be stored using a directory service 722, a web portal 724, a mailbox service 726, an instant messaging store 728, or a social networking site 730. One or more components of the traffic data brokering system 210 are operative or configured to use any of these types of systems or the like for reconciling and brokering traffic data, as described herein. According to an aspect, a server 720 provides the one or more components of the traffic data brokering system 210 to clients 705a,b,c. As one example, the server 720 is a web server providing one or more components of the traffic data brokering system 210 over the web. The server 720 provides one or more components of the traffic data brokering system 210 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for providing accurate and up-to-date traffic data, the system comprising:
   at least one processing device; and
   at least one computer readable data storage device storing instructions that, when executed by the at least one processing device, cause the system to broker traffic data between traffic data sources and traffic data clients, wherein in brokering the traffic data, the system is operative or configured to:
      receive traffic-related data from a plurality of traffic-related data sources;
      identify current traffic conditions based on identified relationships between pieces of the traffic-related data;
      calculate confidence scores for the pieces of the traffic-related data;
      determine one or more of the pieces of the traffic-related data are accurate based on the calculated confidence scores;

update one or more data stores with the accurate traffic-related data;
receive a request for traffic data;
provide one or more pieces of the accurate traffic-related data associated with the request, wherein the one or more pieces of the accurate traffic-related data indicate a current traffic condition associated with the request;
identify characteristics of the current traffic condition;
identify historic traffic data within the one or more data stores for historic traffic conditions that have characteristics similar to the characteristics of the current traffic condition;
identify patterns associated with the historic traffic conditions that have the similar characteristics; and
provide forecasted traffic data, the forecasted traffic data including another traffic condition predicted to occur in association with the current traffic condition based on the identified patterns.

2. The system of claim 1, wherein the plurality of traffic-related data sources comprises a combination of traffic-related data sources selected from a group comprising:
news sources;
weather information sources;
social networks;
traffic cameras;
road sensors;
local, state, or federal transportation agencies;
navigation services;
mobile service providers;
event information sources;
school schedule sources;
mobile client computing devices;
vehicle computing systems;
vehicle sensors; and
navigation client computing devices.

3. The system of claim 1, wherein in receiving the traffic-related data, the system is operative or configured to receive a combination of traffic-related data selected from a group comprising:
road construction information;
road closure information;
traffic incident information;
traffic condition information;
safety and road hazard information;
weather-related information;
event-related information;
schools' schedule information;
location data;
motion data;
speed data;
orientation data;
position data;
wireless network data; and
device pairings.

4. The system of claim 1, wherein the system is further operative or configured to apply machine learning, statistical analysis, behavioral analytics, and data mining techniques to the received traffic-related data for identifying the current traffic conditions.

5. The system of claim 4, wherein in identifying the current traffic conditions, the system is further operative or configured to identify the current traffic conditions based at least in part on identified relationships between the pieces of the received traffic-related data selected from a group comprising: location, time, event, school schedule, traffic condition, weather condition, road condition, and news related matters.

6. The system of claim 1, wherein in calculating the confidence scores for the pieces of the traffic-related data, the system is operative to:
receive, from a traffic-related data source, a confidence score associated with a piece of the traffic-related data; and
calculate a confidence score for the piece of the traffic-related data based on one or a combination of the traffic-related data source-provided confidence score, a weight associated with the traffic-related data source, a weight associated with corroboration of the piece of the traffic-related data with other received traffic-related data, the identified current traffic conditions, and an age of the piece of the traffic-related data.

7. The system of claim 1, wherein to identify the historic traffic data for the historic traffic conditions that have the characteristics similar to the characteristics of the current traffic condition and the patterns associated with the historic traffic conditions, the system is further operative or configured to:
apply statistical analysis, behavioral analytics, and data mining techniques to historic traffic data;
identify characteristics of historic traffic conditions associated with the historic traffic data; and
learn and understand patterns associated with the historic traffic conditions that have shared or similar characteristics.

8. The system of claim 1, wherein the system is further operative or configured to:
retrieve map data or navigation data from a map or navigation data;
merge the current traffic condition with the map data or the navigation data to identify routes between two location points;
calculate distance and estimated travel time metrics based on the current traffic condition;
determine one or more recommended routes based on the calculated metrics; and
provide the one or more recommended routes to a requesting traffic data client via an application programming interface (API).

9. The system of claim 8, wherein the system is further operative or configured to determine the one or more recommended routes further based on the forecasted traffic data.

10. A computer-implemented method for providing accurate and up-to-date traffic data, comprising:
brokering traffic data between traffic data sources and traffic data clients, wherein brokering the traffic data comprises:
receiving traffic-related data from a plurality of traffic-related data sources;
identifying current traffic conditions based on identified relationships between pieces of the traffic-related data;
calculating confidence scores for the pieces of the traffic-related data;
determining one or more of the pieces of the traffic-related data are accurate based on the calculated confidence scores;
updating one or more data stores with the accurate traffic-related data;
receiving a request for traffic data;

providing one or more pieces of the accurate traffic-related data associated with the request, wherein the one or more pieces of the accurate traffic-related data indicate a current traffic condition associated with the request;

identifying characteristics of the current traffic condition;

identifying historic traffic data within the one or more data stores for historic traffic conditions that have characteristics similar to the characteristics of the current traffic condition;

identifying patterns associated with the historic traffic conditions that have the similar characteristics; and providing forecasted traffic data, the forecasted traffic data including another traffic condition predicted to occur in association with the current traffic condition based on the identified patterns.

11. The method of claim 10, wherein identifying the historic traffic data for the historic traffic conditions that have the characteristics similar to the characteristics of the current traffic condition and the patterns associated with the historic traffic conditions, further comprises:

applying statistical analysis, behavioral analytics, and data mining techniques to historic traffic data;

identifying characteristics of historic traffic conditions associated with the historic traffic data; and learning and understanding patterns associated with the historic traffic conditions that have shared or similar characteristics.

12. The method of claim 10, further comprising:

retrieving map data or navigation data from a map or navigation data;

merging the current traffic condition with the map data or the navigation data to identify routes between two location points;

calculating distance and estimated travel time metrics based on the current traffic condition;

determining one or more recommended routes based on the calculated metrics; and providing the one or more recommended routes to a requesting traffic data client via an application programming interface (API).

13. The method of claim 12, further comprising determining the one or more recommended routes further based on the forecasted traffic data.

14. The method of claim 10, wherein receiving the traffic-related data from the plurality of traffic-related data sources comprises receiving the traffic-related data from a combination of traffic-related data sources selected from a group comprising:

news sources;
weather information sources;
social networks;
traffic cameras;
road sensors;
local, state, or federal transportation agencies;
navigation services;
mobile service providers;
event information sources;
school schedule sources;
mobile client computing devices;
vehicle computing systems;
vehicle sensors; and
navigation client computing devices.

15. The method of claim 10, wherein receiving the traffic-related data comprises receiving a combination of traffic-related data selected from a group comprising:

road construction information;
road closure information;
traffic incident information;
traffic condition information;
safety and road hazard information;
weather-related information;
event-related information;
schools' schedule information;
location data;
motion data;
speed data;
orientation data;
position data;
wireless network data; and
device pairings.

16. The method of claim 10, wherein identification of the current traffic conditions is based at least in part on identified relationships between the pieces of the received traffic-related data selected from a group comprising: location, time, event, school schedule, traffic condition, weather condition, road condition, and news related matters.

17. The method of claim 10, wherein calculating the confidence scores for the pieces of the traffic-related data comprises:

receiving, from a traffic-related data source, a confidence score associated with a piece of the traffic-related data; and calculating a confidence score for the piece of the received traffic-related data based on one or a combination of the traffic-related data source-provided confidence score, a weight associated with the traffic-related data source, a weight associated with corroboration of the piece of the traffic-related data with other received traffic-related data, the identified current traffic conditions, and an age of the piece of the traffic-related data.

18. A computer readable storage device including computer readable instructions, which when executed by a processing unit is operative or configured to broker traffic data between traffic data sources and traffic data clients, wherein in brokering the traffic data, the processing unit is operative or configured to:

receive traffic-related data from a plurality of traffic-related data sources;

identify current traffic conditions based on identified relationships between pieces of traffic-related data;

calculate confidence scores for the pieces of traffic-related data;

determine one or more of the pieces of traffic-related data are accurate based on the calculated confidence scores;

update one or more data stores with the accurate traffic-related data;

receive a request for traffic data;

provide one or more pieces of the accurate traffic-related data associated with the request, wherein the one or more pieces of the accurate traffic-related data indicate a current traffic condition associated with the request;

identify characteristics of the current traffic condition;

identify historic traffic data within the one or more data stores for historic traffic conditions that have characteristics similar to the characteristics of the current traffic condition;

identify patterns associated with the historic traffic conditions that have the similar characteristics; and provide forecasted traffic data predicted to occur in association with the current traffic condition based on the identified patterns.

19. The computer readable storage device of claim 18, wherein the processing unit is further operative or configured to identify the current traffic conditions based at least in part on identified relationships between the pieces of the received traffic-related data selected from a group comprising: location, time, event, school schedule, traffic condition, weather condition, road condition, and news related matters.

20. The computer readable storage device of claim 18, wherein to identify the historic traffic data for the historic traffic conditions that have the characteristics similar to the characteristics of the current traffic condition and the patterns associated with the historic traffic conditions, the processing unit is further operative or configured to:
- apply statistical analysis, behavioral analytics, and data mining techniques to historic traffic data;
- identify characteristics of historic traffic conditions associated with the historic traffic data; and
- learn and understand patterns associated with the historic traffic conditions that have shared or similar characteristics.

* * * * *